United States Patent [19]
Cook et al.

[11] Patent Number: 5,857,043
[45] Date of Patent: Jan. 5, 1999

[54] VARIABLE PERIOD AMPLITUDE GRATING MASK AND METHOD FOR USE

[75] Inventors: Thomas A. Cook, Corning; Robert A. Modavis, Painted Post, both of N.Y.

[73] Assignee: Corning Incorporated, Corning, N.Y.

[21] Appl. No.: 878,374

[22] Filed: Jun. 18, 1997

Related U.S. Application Data

[60] Provisional application No. 60/023,895, Aug. 12, 1996.

[51] Int. Cl.⁶ .................................................. G02B 6/34
[52] U.S. Cl. .............................................. 385/37; 385/123
[58] Field of Search ................................. 385/37, 12, 13, 385/10, 123, 129, 147

[56] References Cited

U.S. PATENT DOCUMENTS

| | | | |
|---|---|---|---|
| 4,725,110 | 2/1988 | Glenn et al. | 350/3.61 |
| 5,042,898 | 8/1991 | Morey et al. | 385/37 |
| 5,351,321 | 9/1994 | Snitzer et al. | 385/10 |
| 5,384,884 | 1/1995 | Kashyap et al. | 385/129 |
| 5,502,786 | 3/1996 | Inniss et al. | 385/123 |
| 5,604,829 | 2/1997 | Bruesselbach | 385/37 |
| 5,613,023 | 3/1997 | Guillon et al. | 385/37 |

OTHER PUBLICATIONS

W.W. Morey et al., "Photoinduced Bragg Gratings in Optical Fibers", Optics & Photonics News, Vol. 5, No. 2, pp. 8–14, Feb. 1994.

K.O. Hill et al., "Photosensitivity in Optical Fibers", Annu. Rev. Mater. Sci. 1993.23:125–157. pp. 125–156.

V Bhatia et al., "Optical Fiber Long–Period Grating Sensors", Lightnews, Fiber & Electro–Optics Research Center–Virginia Tech, Winter 1995, pp. 6–11.

A.M. Vengsarkar et al., "Long–period fiber grating–based gain equalizers", Optics Letters. vol. 21, No. 5, pp. 336–338, Mar. 1, 1996.

A. M. Vengsarkar et al., "Long–Period Fiber Gratings as Bond–Rejection Filters", Journal of Lightwave Technology, vol.14, No. 1, pp. 58–65.

G. Meltz et al., "Formation of Bragg gratings in optical fibers by a transverse holographic method", Optical Society of America, pp. 823–825, 1989.

G. W. Yoffe et al., "Temperature–compensated optical–fiber Bragg gratings", OFC '95 Technical Digest, pp. 134–135.

*Primary Examiner*—Phan T. H. Palmer
*Attorney, Agent, or Firm*—William Greener, Esq.

[57] ABSTRACT

A variable period amplitude grating mask for use in making a long period Bragg grating is realized by a helically coiled spring. Stretching or compressing the spring changes the periodicity of the mask. A photosensitive optical waveguide, planar or fiber, is positioned within the spring coils along the major axis of the spring. Actinic radiation is incident on the masked waveguide, and induces an index perturbation in the waveguide having the periodicity of the mask. Different spring coil sizes and/or orientation of the waveguide with respect to the mask provide linear and nonlinear (chirped) grating periods. A device and method are described.

20 Claims, 2 Drawing Sheets

VARIABLE PERIOD AMPLITUDE GRATING MASK AND METHOD FOR USE

This application claims the benefit under 35 USC §119(e) of U.S. Provisional Application No. 60/023,895 filed Aug. 12, 1996.

FIELD OF THE INVENTION

This invention relates to a method and apparatus for accurately controlling the periodicity of a photo-induced refractive index perturbation in a photosensitive optical waveguide, and more specifically relates to a variable period amplitude rating mask and method for the use thereof in creating a long period fiber Bragg grating.

BACKGROUND OF THE INVENTION

Since the discovery of the photosensitivity effect in germania fibers wherein he refractive index of an optical waveguide can be increased by exposing the waveguide to a light source, a variety of devices such as optical filters, WDMs, reflectors, and others, have been made and proposed. These devices often employ a long period grating (on the order of a few hundred microns) which couples light over a narrow band of wavelengths from the core layer of a waveguide to the cladding layer thereby acting as a wavelength selective loss element. An application for this type of device is, for example, the flattening of the gain spectrum of an erbium doped fiber amplifier. Various methods have been described for inducing periodic variations in the index of refraction in the core region of a photosensitive optical fiber, including the use of interferometric fringe patterns, phase masks, point by point index variation, and others. A discussion of the background, methods, and photoinduction process involved in making fiber gratings can be found in Hill et al., *Photosensitivity in Optical Fibers,* Annual Review of Materials Science, 23, 1993, 125–157. More recently, several articles by Vengsarkar et al. have been published which describe the theory and manufacture of long period fiber gratings and their use as band rejection filters, gain equalizers and sensors. In Vengsarkar et al., *Long-period fiber gratings as band-rejection filters,* in Proceedings of Conference on Optical Fiber Communications, OFC '95, post-deadline paper, PD4-2, 1995, and Bhatia et al., *Optical Fiber Long Period Grating Sensors,* Light News, Fiber and Electro Optics Research Center, Virginia Technical Institute and State University, pp. 6–11 (Winter 1995), both of which are herein incorporated by reference, a set-up is proposed for fabricating a long period grating in a hydrogen loaded (3.4 mole %) germanosilicate fiber exposed to 248 nm radiation from a KrF excimer laser through a chrome plated amplitude mask having a periodic rectangular transmittance function. The use of a chrome plated amplitude mask as suggested in these publications is limited to attempting to provide a fixed period grating designed for a particular loss wavelength. Further, the chrome on silica masks have a damage threshold of about 100 mJ/cm$^2$-pulse before the chrome is ablated, limiting the light source fluence used and the mask longevity.

SUMMARY OF THE INVENTION

Accordingly, we have recognized a need for an amplitude grating mask having an easily and accurately controllable periodicity which provides for tunability of the spectral loss feature of the grating, and further provides a mask capable of withstanding greater radiation intensity than presently available amplitude masks. The invention is directed to an apparatus and a method providing such features.

Additional features and advantages of the invention will be set forth in the description which follows, and in part will be apparent from the description, or may be learned by practice of the invention. The objectives and other advantages of the invention will be realized and attained by the apparatus and method particularly pointed out in the written description and claims hereof as well as the appended drawings.

To achieve these and other advantages and in accordance with the purpose of the invention, as embodied and broadly described, the invention describes an amplitude mask for use in writing a refractive index perturbation in a photosensitive optical waveguide with actinic radiation, in which the mask has a periodicity that can be varied in a controllable manner to obtain a desired, accurate periodicity of the index perturbation in the optical waveguide; i.e., to form a grating in the waveguide. In an embodiment of the invention, the mask has a connected series of masking portions that are substantially transversely oriented to the major longitudinal axis of the mask, akin to the ties of a railroad track, at least when small or no tensile forces are exerted on the ends of the mask. The mask as a whole substantially obeys Hooke's Law; i.e., a tensile force applied to a non-stationary end of the mask will cause a uniformly increasing periodicity of the masking portions, and, conversely, a compressive force applied to a non-stationary end of the mask will cause a uniformly decreasing periodicity of the masking portions.

In an embodiment of the invention the variable period amplitude mask is a helically coiled spring wherein each of the spring coils is a masking portion of the mask. The masking coils have a substantially constant orientation with respect to each adjacent masking coil, and the spring mask has a variable, controllable periodicity depending upon the nature and magnitude of the force applied to a non-stationary end of the spring; i.e., the extent of compression or extension of the spring within the elastic limit of the spring material. In one aspect of this embodiment, all of the spring masking coils have a substantially constant and equal diameter or size which is useful for producing a constant period index perturbation in a photosensitive waveguide when the waveguide is positioned at a constant, uniform distance from the mask surface. In an alternative aspect of the invention, the masking coils do not all have substantially the same diameter or size; for example, the spring mask may have a conical taper along its longitudinal direction, or the coil size may increase and/or decrease over the length of the mask, such that the periodicity of the index variation in the waveguide will vary accordingly over the length of the masked portion of the waveguide. These configurations of the mask are useful for producing a chirped grating, for example.

An embodiment of the invention contemplates the mask being a coiled spring made out of steel, aluminum, silica or other materials having the characteristics and features described above, particularly materials being capable of withstanding higher fluence levels than conventional mask materials, and having low absorption at the photo-inducing radiation wavelength.

In another embodiment of the invention, a variable period amplitude mask is in the form of a planar spring having features similar to those of the helically wound spring embodiment except that each masking portion is substantially a 2-dimensional structure having a length sufficient to traverse a photosensitive waveguide, rather than being a 3-dimensional coil.

The invention also relates to a method for accurately producing a photoinduced index perturbation having any desired periodicity in a photosensitive waveguide. The method includes the steps of providing a variable period amplitude mask such as that described above, elongating or compressing the mask within its elastic limit to an approximate desired periodicity reflecting the desired periodicity of the index perturbations to be produced, masking a non-coated photosensitive waveguide or a stripped or bare portion thereof with the mask by positioning the masking portions of the mask intermediate the waveguide and the radiation source, and exposing the masked waveguide to appropriate actinic radiation to photo-induce an index perturbation in the waveguide. Another aspect of the method embodiment further involves the steps of determining the actual resultant periodicity of the index perturbation in the waveguide and comparing it with the desired periodicity, adjusting the periodicity of the mask based upon the above comparison, and iteratively applying the steps of masking and exposing the non-coated waveguide or portion thereof until the desired periodicity in the waveguide is obtained. These steps include masking and exposing a completely new, unexposed waveguide or section thereof, and in the alternative, overlaying or slightly displacing the previously exposed region.

It will be appreciated that the photosensitive waveguide referred to herein, which is not part of the invention per se, can be in the form of a fiber or planar waveguide; however, for the sake of convenience of discussion a fiber waveguide will be hereinafter referred to. It will be further appreciated that the periodicity of the induced index perturbation can be made constant or non-constant (e.g., chirped), depending upon the periodicity of the mask and/or the orientation and position of the fiber with respect to the mask. For example, when the fiber is oriented rectilinearlly with respect to the masking portions, the photo-induced index perturbation in the fiber will have a substantially constant, single period. On the other hand, if the fiber is curved with respect to the longitudinal axis of the mask such that the distance between the masked regions of the fiber varies over the length of the mask, a nonlinear index period, or chirped grating, will be produced in the fiber.

It is to be understood that both the foregoing general description and the following detailed description are exemplary and are intended to provide further explanation of the invention as claimed.

The accompanying drawings are included to provide a further understanding of the invention and are incorporated in and constitute a part of this specification, illustrate embodiments of the invention and together with the description serve to explain the principles of the invention.

DETAILED DESCRIPTION OF A PREFERRED EMBODIMENT OF THE INVENTION

An amplitude grating mask for a photosensitive optical waveguide has a variable period provided by the separation between a plurality of elastically coupled, adjacent masking regions; the separation of the masking regions and thus the period of the mask being controlled by the amount of extension or compression of the mask due to an applied force on a nonstationary end thereof along the longitudinal axis of the mask.

Figure 1:
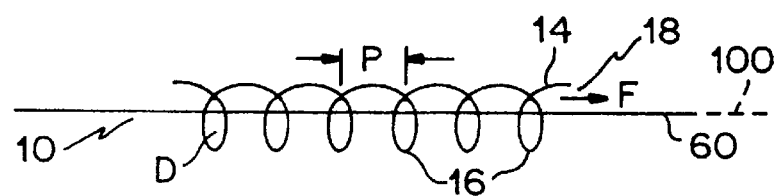
FIG. 1 shows an embodiment of the variable period amplitude mask of the invention as a helically coiled spring in which the coils are all of the same size, the mask having a period, P, as a function of an extension force, F.
Figure 2:
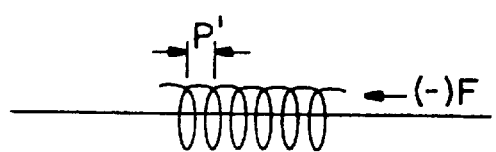
FIG. 2 illustrates the mask of FIG. 1 having a different period, P', as a function of a compressive force, (-)F.
Figure 3:
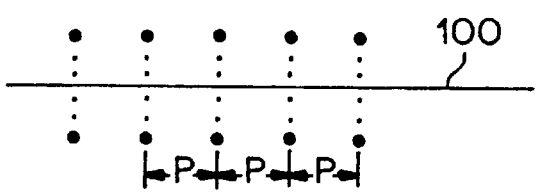
FIG. 3 is a schematic cross sectional view of the mask of FIG. 1, showing a uniform, linear period. P.

Reference will now be made in detail to the present preferred embodiments of the invention, examples of which are illustrated in the accompanying drawings. Referring to FIG. 1, an amplitude grating mask designated generally by reference numeral 10 for masking a photosensitive optical waveguide, consists of a helically coiled spring 14 having a plurality of spring coils 16, each of which defines a masking portion of the mask 10. The coils 16 each have an effective size or diameter, D, sufficient to encircle a cross sectional portion of the waveguide 100, shown here as a fiber, when the waveguide 100 is positioned along a longitudinal axis 60 of the spring 14. In a preferred embodiment, the size of the coils 16 are substantially the same. The mask 10 has a period, P, that is a function of the separation between adjacent coils 16. Due to the elasticity of the spring (i.e., the spring obeys Hooke's Law), the period P can be varied in a controllable manner by applying a force, F, to a nonstationary end 18 of the spring 14 along axis 60 to compress the spring or extend it within the elastic limit of the spring. FIG. 2 illustrates the spring mask 10 having a decreased period, P', due to a compressive force (-)F as shown. In FIG. 3, the mask 10 is shown in cross section with the fiber waveguide 100 oriented rectilinearlly along the longitudinal axis 60 of the spring and passing through each coil 16 at a substantially constant radial location within each coil. In this embodiment, the masking portions 16 are substantially transverse to the waveguide 100 and to axis 60, and the mask has a uniform period, P, over the length of the mask. The spring 14, used as the variable period amplitude mask of the invention, can be of any suitable material capable of withstanding higher than reported fluence levels of photo-inducing radiation for chrome plated amplitude masks (about 100 $mJ/cm^2$-pulse). In a preferred embodiment, the spring material comprises aluminum, steel or silica, these materials being capable of withstanding fluence levels in the range between about 100 $mJ/cm^2$-pulse to 1000 $mJ/cm^2$-pulse, and having lower absorption in the U.V. wavelength band of photo-inducing radiation than conventional chrome plated masks. For the application of writing a long period Bragg grating, the spring preferably will have a coiled length of between about 2 mm to 20 cm, and the periodicity will be adjustable between about 10 $\mu$m to 1000 $\mu$m.

Figure 4:
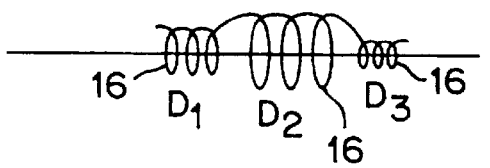
FIG. 4 shows an alternative aspect of the mask embodiment of FIG. 1 in which the coils are not all of substantially the same size, resulting in a nonlinear period under a compressive or extension force.
Figure 5:
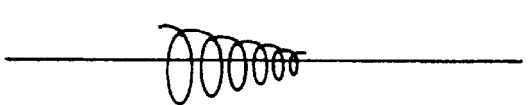
FIG. 5 shows another embodiment of the mask in which the spring has a conical taper over its length.
Figure 6:
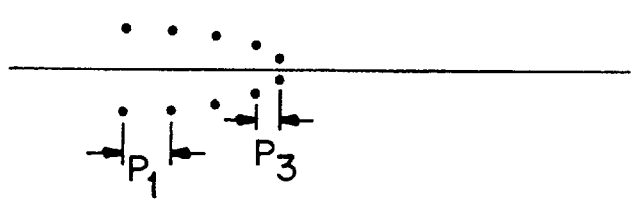
FIG. 6 is a schematic cross sectional view of the mask of FIG. 5 showing the nonlinear periodicity of the mask.

In an alternative aspect of the embodiment just described, the sizes of the spring coils 16 are not all substantially the same. FIGS. 4 and 5, for example, respectively show two variations on this embodiment. In FIG. 4, a first group of coils or masking regions 16 have a size $D_1$, a second group have a size $D_2$, and a third group have a size $D_3$. In FIG. 5, the spring 14 has a conical taper over its length such that the size of the coils 16 increases or decreases uniformly over the length of the mask. These examples provide a nonlinear or chirped period for a particular spring extension/compression due to the different separations between coils of differing sizes in response to an applied force. FIG. 6 shows the conically tapered spring mask 14 of FIG. 5 in cross section, along with the nonlinear nature of the period of the device.

Figure 8:
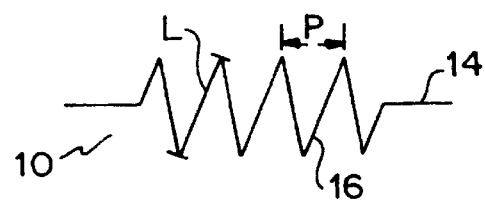
FIG. 8 shows a schematic plan view of an embodiment of the invention in which the variable period amplitude mask is in the form of a planar spring.

Another embodiment of the invention is shown in FIG. 8. In this embodiment, the variable period amplitude mask is in the form of a planar spring 14, having a plurality of elastically coupled masking regions 16 of size L. The size, L, of the masking portions can all be substantially the same in which case the mask will be used to produce a linear index perturbation, or alternatively, L can increase or decrease uniformly or nonuniformly over the length of the mask in order to make nonlinear index perturbations in the photosensitive waveguide.

Figure 7:
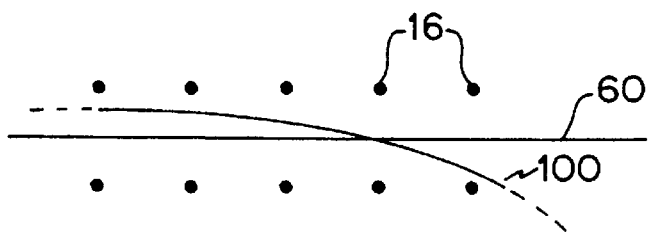
FIG. 7 is a schematic cross sectional view of the mask of FIG. 1 including a fiber waveguide oriented curvilinearily with respect to the mask.

An embodiment of the invention further contemplates a method for creating a photo induced index perturbation in a photosensitive optical waveguide, comprising the steps of masking the photosensitive waveguide with a variable period amplitude grating mask such as that described above, and exposing the masked waveguide section to actinic radiation to photoinduce the index perturbation. In a preferred method embodiment of the invention, a method for creating a long period Bragg Grating in a photosensitive optical fiber waveguide involves masking a stripped or bare cladding section of the fiber with a variable period amplitude grating mask, preferably such as the helically coiled spring mask described above, wherein the period of the masking regions is controllably varied by applying a force to a nonstationary end of the mask along a longitudinal axis of the mask, adjusting the period of the mask to substantially equal a desired period of the index perturbation to be written in the waveguide, and then exposing the masked waveguide section to U.V. radiation to photoinduce the index perturbation. In an aspect of this embodiment for creating a constant period grating in the fiber, the fiber is oriented substantially rectilinearlly along the longitudinal axis of the mask, as illustrated in FIG. 3. In an alternative aspect, for writing a chirped grating, as illustrated in FIG. 7, the fiber 100 can be in a curvilinear orientation such that each adjacent unmasked region of waveguide has a longer or shorter length with respect to each other region. Actinic radiation having a wavelength between about 190 nm to 260 nm, as is well appreciated by those skilled in the art as appropriate photo-inducing radiation, is used to write the grating. An embodiment of the invention contemplates that the U.V. light has a fluence level in the range of between about 100 mJ/cm$^2$-pulse to 1000 mJ/cm$^2$pulse, which is possible due to the material composition of the spring mask.

An aspect of the invention includes the further steps of determining the periodicity of the photo-induced index perturbation in the waveguide, by means well known to those skilled in the art, adjusting the period of the mask to more closely equal the desired period of the grating (i.e., to more accurately define the loss spectrum), exposing the photosensitive waveguide again to appropriate radiation, and repeating this process until the desired index periodicity in the waveguide is obtained. It will be appreciated that the same section of stripped fiber can be overwritten, the fiber can be longitudinally displaced by a minute amount and then re-exposed, or a completely new section of stripped fiber can be masked and exposed as described above.

EXAMPLE I

Figure 9:
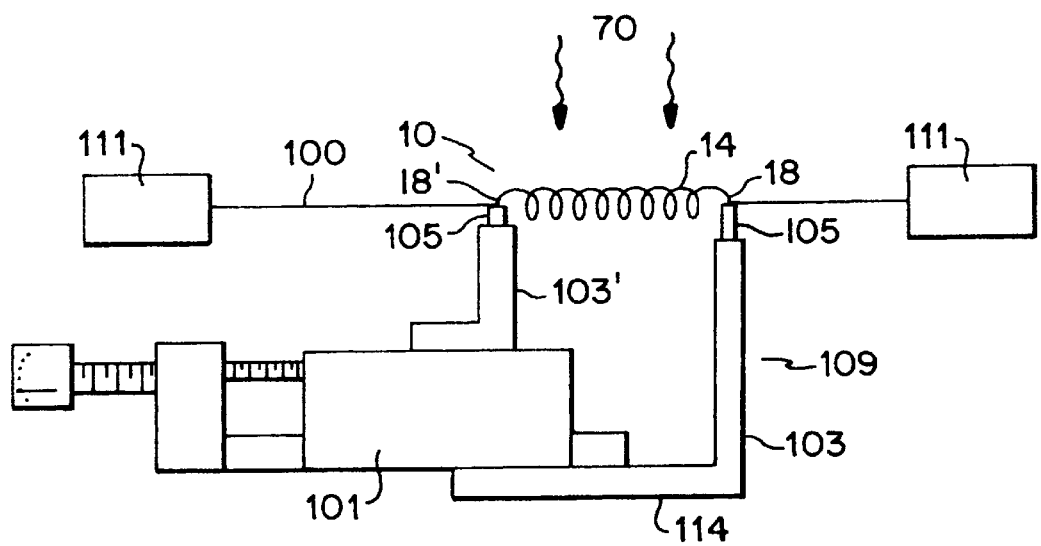
FIG. 9 schematically shows an exemplary embodiment of a method and apparatus of the invention.
Figure 10:
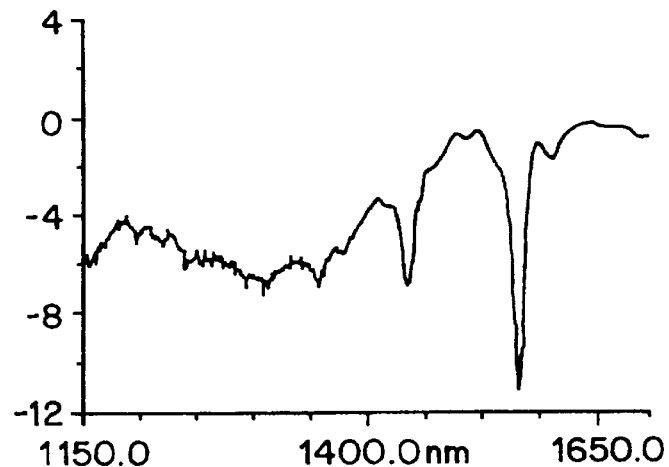
FIG. 10 is a plot of the transmission spectrum of a long period grating written by an exemplary embodiment of the invention.

An exemplary embodiment of the method and apparatus of the invention will now be described with reference to FIG. 9 wherein like reference numerals represent like components of the embodiments shown in the accompanying figures. A variable period amplitude spring mask 10 was provided by a helically coiled spring 14 made of 10 mil (250 µm) steel wire. The opposite ends 18, 18' of the spring were respectively attached to the brackets 103, 103' via two 2/56 machine screws 105. Bracket 103 was attached to the fixed base 114 of a translation mount 109 and bracket 103' was attached to a Newport model 41105S translation stage 101, so that a controlled stretch could be applied to the spring 14. The spring was stretched to provide a 400 µm period thus providing 150 µm windows for the photo-inducing radiation 70, which comprised 248 nm light from an excimer laser (not shown). The spring had an overall coiled length of approximately 2.5 cm, and each of the spring coils had a diameter of approximately 2 mm to 3 mm. A length of Corning SMF-28 optical fiber 100 which was hydrogen loaded at 100 atm., was stripped to its bare cladding over a portion thereof, and was rectilinearlly mounted through the spring coils such that they masked the stripped portion of fiber. The fiber was held taut but not strained, therein, by mounts 111. The masked region of the fiber was exposed to 150 mJ/cm$^2$-pulse for 10 minutes at 10 hz, followed by a 7 minute exposure at 20 hz, followed by a 45 second exposure at 5 hz. FIG. 10 shows the transmission spectrum of the resulting long period Bragg grating, and further shows two principle loss dips at approximately 1435 nm and 1530 nm, respectively.

It will be apparent to those skilled in the art that various modifications and variations can be made in the apparatus and method of the present invention without departing from the spirit or scope of the invention. Thus, it is intended that the present invention cover the modifications and variations of this invention provided they come within the scope of the appended claims and their equivalents.

We claim:

1. A variable period amplitude grating mask for a photosensitive optical waveguide, comprising:
   a plurality of elastically coupled adjacent masking regions, said mask having a period defined by a distance between said coupled adjacent masking regions, wherein said period is variable in a controlled manner as a function of a force applied to a nonstationary end of the mask in a direction of a longitudinal axis of the mask.

2. The mask of claim 1 in which the masking regions are oriented substantially transverse to a longitudinal axis of the mask.

3. The mask of claim 1 in which the period is variable between about 10 µm to 1000 µm.

4. The mask of claim 1 wherein the masking regions are not all of substantially the same size.

5. The mask of claim 1 comprising a helically coiled spring.

6. The mask of claim 1 comprising a planar spring.

7. An amplitude grating mask for a photosensitive optical waveguide, comprising:
   a helically coiled spring having a plurality of spring coils each of which defines a masking portion, said plurality of spring coils each having a diameter sufficient to encircle a cross sectional portion of the waveguide when the waveguide is positioned along a longitudinal axis of the spring, wherein said masking portions have a variable periodicity that depends upon an extension or compression of the spring within an elastic limit of the spring.

8. A method for creating a photo-induced index perturbation in a photosensitive optical waveguide, comprising the steps of:

a) masking a bare cladding section of the photosensitive waveguide with a variable period amplitude grating mask comprising multiple elastically coupled masking regions wherein the period of the masking regions is controllably varied by applying a force to a nonstationary end of the mask along a longitudinal axis of the mask, said mask period being adjusted to substantially equal a desired periodicity of the index perturbation to be photo-induced in the waveguide; and b) exposing the masked waveguide section to actinic radiation to photoinduce the index perturbation.

9. The method of claim 8 further comprising c) determining the periodicity of the photo-induced index perturbation in the waveguide; and d) repeating steps (a) and (b) until the desired index periodicity in the waveguide is obtained.

10. The method of claim 9 wherein step (d) further comprises performing step (a) on a previously exposed section of the waveguide.

11. The method of claim 9 wherein step (d) further comprises performing step (a) on a previously unexposed section of the waveguide.

12. The method of claim 8 wherein the step of masking the waveguide comprises positioning the waveguide with respect to the mask such that at least a portion of the masking regions are intermediate the waveguide and the source of radiation and the waveguide is oriented substantially rectilinearlly along the longitudinal axis of the mask.

13. The method of claim 8 wherein the step of masking the waveguide comprises positioning the waveguide with respect to the mask such that at least a portion of the masking regions are intermediate the waveguide and the source of radiation and the waveguide is oriented substantially curvilinearily along the longitudinal axis of the mask.

14. The method of claim 8 wherein the step of exposing the waveguide to actinic radiation comprises using light having a wavelength between about 190 nm to 260 nm, having a fluence in the range between about 100 mJ/cm$^2$-pulse to 1000 mJ/cm$^2$-pulse.

15. A method for making a long period Bragg grating in a photosensitive optical fiber waveguide, comprising the steps of:

a) masking the fiber by positioning a bare cladding section of the fiber within the coils of a helically coiled spring along a longitudinal axis of the spring;

b) adjusting the period of the spring to between about 10 $\mu$m to 1000 $\mu$m by applying a force to an end thereof, said period being approximately equal to a desired period of the Bragg grating in the fiber; and c) exposing the masked fiber to actinic radiation to photoinduce an index perturbation in the fiber.

16. The method of claim 15 further comprising d) determining the periodicity of the photo-induced index perturbation in the fiber; and e) repeating steps (a) and (c) until the desired index periodicity in the fiber is obtained.

17. The method of claim 16 wherein step (e) further comprises performing step (a) on a previously exposed section of the fiber.

18. The method of claim 16 wherein step (e) further comprises performing step (a) on a previously unexposed section of the waveguide.

19. The method of claim 15 wherein the step of masking the fiber comprises positioning the fiber in a rectilinear configuration along the longitudinal axis of the spring.

20. The method of claim 15 wherein the step of masking the fiber comprises positioning the fiber in a curvilinear configuration along the longitudinal axis of the spring.

\* \* \* \* \*